(12) United States Patent
Burr et al.

(10) Patent No.: US 8,434,083 B2
(45) Date of Patent: Apr. 30, 2013

(54) THROTTLING AN ASYNCHRONOUS REMOTE COPYING SYSTEM

(75) Inventors: Dale Burr, Hampshire (GB); Carlos Francisco Fuente, Hampshire (GB); William James Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 11/938,593

(22) Filed: Nov. 12, 2007

(65) Prior Publication Data

US 2008/0114954 A1    May 15, 2008

(30) Foreign Application Priority Data

Nov. 15, 2006  (GB) .................................. 0622734.2

(51) Int. Cl.
*G06F 9/46* (2006.01)
(52) U.S. Cl.
USPC .......................................... 718/101; 718/105
(58) Field of Classification Search .................. 718/101, 718/105
See application file for complete search history.

(56) References Cited

U.S. PATENT DOCUMENTS

| 5,734,818 | A | 3/1998 | Kern et al. |
| 2004/0193802 | A1 | 9/2004 | Meiri et al. |
| 2004/0260977 | A1 | 12/2004 | Ji et al. |
| 2005/0204105 | A1* | 9/2005 | Kawamura et al. ........... 711/162 |
| 2011/0010513 | A1 | 1/2011 | Burr |
| 2012/0215994 | A1 | 8/2012 | Burr |

* cited by examiner

*Primary Examiner* — Li B Zhen
*Assistant Examiner* — Bradford Wheaton
(74) *Attorney, Agent, or Firm* — Century IP Group, Inc.; F. Jason Far-hadian, Esq.

(57) ABSTRACT

A storage control system comprising: one or more I/O processors for receiving requests to write data; a batch controller for selecting one or more write requests to be placed in a first batch; a first server for transmitting the first batch to a second server in a remote copy pair system; one or more I/O handlers for writing the first batch to completion on a data storage medium, in response to receiving permission from the second server; and one or more clients for communicating with the I/O processors and the I/O handlers, wherein the permission is granted when the second server is notified by the I/O handlers that previous write requests have been completed, wherein the first server is responsive to the completion of the first batch.

12 Claims, 2 Drawing Sheets

THROTTLING AN ASYNCHRONOUS REMOTE COPYING SYSTEM

CROSS REFERENCE TO RELATED APPLICATIONS

Pursuant to 35 U.S.C. §119(a), this application claims the benefit of earlier filing date and right of priority to British Patent Application No. 0622734.2, filed on Nov. 15, 2006, the content of which is hereby incorporated by reference herein in its entirety.

TECHNICAL FIELD

This invention relates to an asynchronous remote copying system. In particular, this invention relates to an asynchronous remote copying system that throttles asynchronous copying when the primary impact becomes too great.

BACKGROUND

Critical data is often protected against disasters by copying it to a remote site. One technique in use for this purpose is known as Remote Copy.

Remote Copy is the pairing of a data storage system (or a logical volume of the data storage system) with another data storage system for use as a backup. The original data storage system is known as the primary storage and the backup data storage system is known as the secondary. Whenever data is written to the primary, the data is also to be written to the secondary, to ensure the backup stays up to date. Remote Copy may be implemented synchronously—that is, processing at the host is delayed until confirmation of the completion of the corresponding write at the secondary has been received—or it may be implemented asynchronously.

Asynchronous Remote Copy (ARC) means that the host that wrote the data to the primary is not delayed while data is copied to the secondary; as soon as the data has been written to the primary, the host is notified of completion. The data is then copied to the secondary asynchronously.

One of the main challenges when implementing ARC is maintaining consistency of the secondary disk. Herein, "maintaining consistency" means keeping the secondary data in a state that the primary data could have been in at some point during the process. In other words, the secondary data is allowed to be 'out of date' (i.e. a certain number of updates have not yet been applied to the secondary), but it is not inconsistent, in that the updates are available.

Table 1 below shows a sequence of events. During these events the secondary is out of date in relation to the primary, but the data it contains always matches something that the host could have read from the primary, and thus the secondary is always consistent.

TABLE 1

| Action | Primary | Secondary |
| --- | --- | --- |
| 1. Host writes AAA to disk | AAAXXX | XXXXXX |
| 2. Write from step 1 completes to the host | AAAXXX | XXXXXX |
| 3. Host writes BBB to disk | AAABBB | XXXXXX |
| 4. Remote copy sends AAA to the secondary | AAABBB | AAAXXX |
| 5. Remote copy sends BBB to the secondary | AAABBB | AAABBB |

Table 2 below shows a sequence of events in which the updates to the secondary are applied in the wrong order. The write issued in action 3 is a "dependent write" as it is issued after the write of AAA completes. BBB may therefore only be written to the disk after AAA.

If the primary had failed after action 4, the secondary would have been left inconsistent, as the host knows that at no point did the primary contained the data XXXBBB.

TABLE 2

| Action | Primary | Secondary |
| --- | --- | --- |
| 1. Host writes AAA to disk | AAAXXX | XXXXXX |
| 2. Write from step 1 completes to the host | AAAXXX | XXXXXX |
| 3. Host writes BBB to disk | AAABBB | XXXXXX |
| 4. Remote copy sends BBB to the secondary | AAABBB | XXXBBB |
| 5. Remote copy sends AAA to the secondary | AAABBB | AAABBB |

A known approach maintains consistency by forming a batch of writes that enters the primary and assigning the batch a unique sequence number, such that if a batch of writes B arrives after a batch of writes A it will have a higher sequence number. Within each batch, writes are chosen from different I/O processors 104 and are mutually independent of each other.

In such a batch scheme, the secondary may execute one batch of writes at a time in order to maintain data consistency. However, the primary is not subject to these constraints; it may perform I/Os in parallel, since it is the responsibility of each host to ensure it submits writes in a manner that will ensure consistency.

Generally, if the host has to perform any processing between writes, or if the host is doing reads as well, the I/O load at the primary which is mirrored to the secondary is less than the maximum I/O load that the secondary may cope with, so the system is balanced.

However, in heavy write workloads, the system is unbalanced and the secondary builds up a queue of batches waiting to be processed. This may be caused when the secondary has less capacity than the primary, when there is a transient fault in the secondary or when a network bottle neck occurs. The primary may have a finite number of batches (several hundred) outstanding at any given time, since it requires resources to keep track of each batch that is in progress. The primary quickly reaches its limit of outstanding batches, and waits for the secondary to complete some batches before any more may be granted. In this situation, if a RequestSequenceNumber call is made to the Primary Server, the primary sever stalls until the primary server receives a WriteBatchDone call from the secondary server 109.

As a result, the primary response time is disproportionately affected by any fluctuations in the secondary response time. Consider the following scenario. The secondary is processing a batch of 100 writes, which might normally take 1 ms to complete. The secondary has a problem or the secondary is so heavily loaded that the secondary stalls for 100 ms. During this time, 2000 write I/Os arrive at the primary and all stall waiting for their RequestSequenceNumber calls to complete. But the new writes can't complete until the secondary completes a batch and frees up a sequence number.

The secondary completes the batch (after a 100 ms delay). The RequestSequenceNumbers complete with a latency of 100 ms. Each of the 2000 primary I/Os sees a latency of 100 ms, instead of the usual expected ~1 ms latency. This causes the average latency seen by the host to go up by a large amount.

Slow processing of 100 writes on the secondary causes a slow response time to the host for 2000 writes, magnifying the delay by a factor of 20. This is not the case with Synchronous Remote Copy, where one slow secondary I/O will cause one slow response time to the host.

SUMMARY

The first aspect of the invention provides a storage control system adapted to operate as a remote copy pair by communicating between a primary and a secondary of the remote copy pair. The system may comprise one or more I/O processors for receiving requests to write data; a batch controller for selecting one or more write requests to be placed in a first batch; a first server for transmitting the first batch to a second server in a remote copy pair system; one or more I/O handlers for writing the first batch to completion on a data storage medium, in response to receiving permission from the second server; and one or more clients for communicating with the I/O processors and the I/O handlers, wherein the permission is granted when the second server is notified by the I/O handlers that previous write requests have been completed, wherein the first server is responsive to the completion of the first batch.

The first server may respond to the completion of the first batch by delaying the transmission of the second batch to the second server based on the number of batches waiting to be written by the I/O handlers. In one embodiment, the delay is inserted into the process by delaying the issuing of batch sequence numbers.

In another embodiment, the storage control system operates as a remote copy pair by communicating between a primary and a secondary of said remote copy pair. The method may comprise receiving requests to write data; selecting one or more write requests to be placed in a first batch; transmitting the first batch to a second server in a remote copy pair system; and writing the first batch to completion on a data storage medium, in response to receiving permission from the second server, wherein the permission is granted when the second server is notified by the I/O handlers that previous write requests have been completed, wherein the transmitting is responsive to the completion of the first batch.

In one embodiment, the rate at which sequence numbers are granted is controlled, for example, by issuing a sequence number in 2 ms increments instead of 1 ms increments. This will throttle the primary, preventing the secondary from getting too far behind. This will also help prevent the primary from running out of sequence numbers.

The problem with constantly limiting the sequence number grant is that it results in a constantly reduced primary I/O performance, even in situations where the I/O load is not that heavy. Also, limiting the sequence number grant will not prevent the primary from running out of sequence numbers if the secondary continually takes more than 2 ms to complete each batch.

Therefore, generally, the primary I/O isn't throttled back until the secondary starts to fall behind. This is done by limiting the rate at which sequence numbers are issued on the primary after the sequence numbers start to run out. A shortage of sequence numbers indicates that the secondary is falling behind. The further behind the secondary gets, the longer write Requests will stall. This will have the effect of throttling primary I/O since I/O can't continue until it has a sequence number. It also allows the secondary to catch up. When the secondary starts to catch up, the delay on the write requests will be reduced, eventually getting back to zero.

The advantage of this solution is that there is no impact on primary I/O performance during "normal" conditions, so the majority of workloads are unaffected. For heavy I/O workloads, the primary I/O may be throttled back gradually until it is at a rate where the secondary can keep up.

BRIEF DESCRIPTION OF THE DRAWINGS

One embodiment of the present invention will now be described, by way of example only, with reference to the accompanying figures, in which.

DETAILED DESCRIPTION OF EXEMPLARY EMBODIMENTS

An embodiment of the present invention addresses an asynchronous remote copying system that places independent writes into batches.

Figure 1:
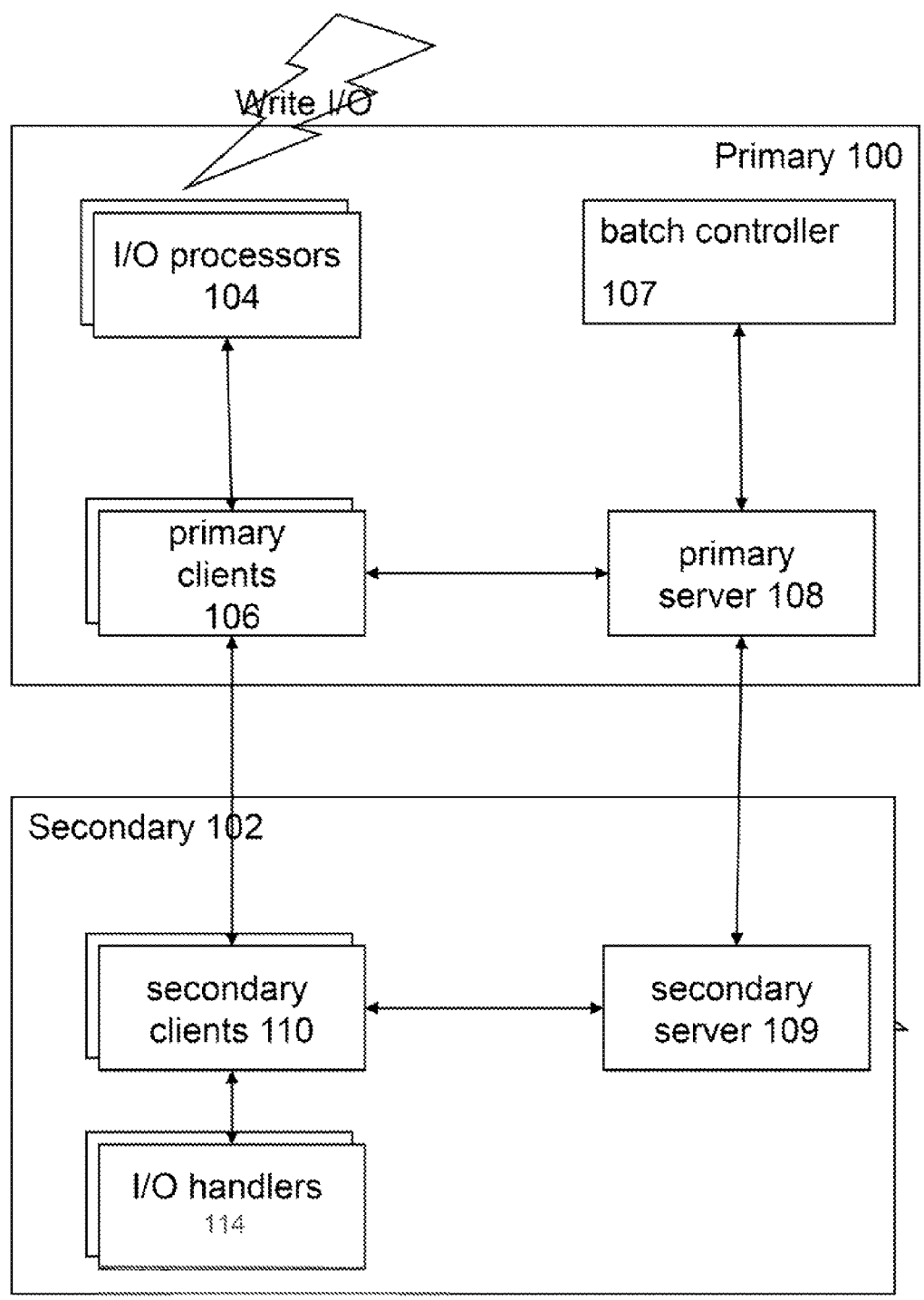
FIG. 1 shows a block diagram of system components in accordance with an embodiment of the invention.

Referring to FIG. 1, in an exemplary multi I/O processor system, primary 100 comprises one or more I/O processors 104. I/O processors 104 receive write I/O commands, for example, from a host apparatus (not shown). Each I/O processor 104 is in operative communication with a primary client 106, and each primary client 106 is cooperatively connected to primary server 108. Primary clients 106 may comprise computing systems that communicate with primary server 108 to access shared resources (e.g., a data storage medium). Primary server 108 receives a control input from batch controller 107. Batch controller 107 controls the frequency and size of the batches by restricting the issuance of sequence numbers at primary server 108.

Secondary 102 comprises secondary clients 110, which are operatively coupled to secondary server 109 and I/O handlers 114. Each I/O handler 114 is operable in communication for the purpose of performing write I/Os with data storage (not shown), which may comprise any of the known forms of data storage, for example, but not limited to, magnetic disk storage, tape storage or the like. Primary clients 106 at primary 100 are linked over a communications link with secondary clients 110 at secondary 102, and primary server 108 at primary 100 is linked over a communications link with secondary server 109 at secondary 102. It is noteworthy that the arrangement and location of primary and secondary clients and servers is intended to be exemplary only, and many other arrangements are envisaged, as for example, locating clients or servers at intermediate and communicating nodes of a data processing or communications network.

In such a system, I/O processors 104 request sequence numbers for writes from primary server 108. Primary server 108 returns the sequence numbers that are issued by batch controller 107. Primary 100 sends a batch of writes (i.e., writes with the same sequence number) to secondary 102. When these writes have completed, the next batch is sent to secondary 102. Secondary 102 processes the writes as it receives them. This increases secondary 102's concurrency and reduces the amount of inter-node messaging.

The method of assigning sequence numbers to writes is based on the following observations:

Writes that have been issued by the host without receiving completions are independent (they haven't completed, so they can't depend on each other).

These writes may be given the same sequence number and applied in any order on secondary 102, as they may be applied in any order on primary 100.

Batches are formed according to the following policy:

Writes that are outstanding on a given node may be placed in the same batch. One sequence number request for the batch may be sent to primary server 108, reducing the number of messages and message resources that are required.

Requests that arrive at primary server 108 such that they are processed at the same time may be placed in the same batch. This increases the batch size further, increasing the number of writes that may be done concurrently on secondary 102 and thereby improving performance.

Writes to I/O processors 104 that are related use the same instance of the protocol to ensure that consistency between these disks is maintained. Unrelated disks may use different instances of the protocol (i.e., they may have separate sequence number servers and clients).

Figure 2:
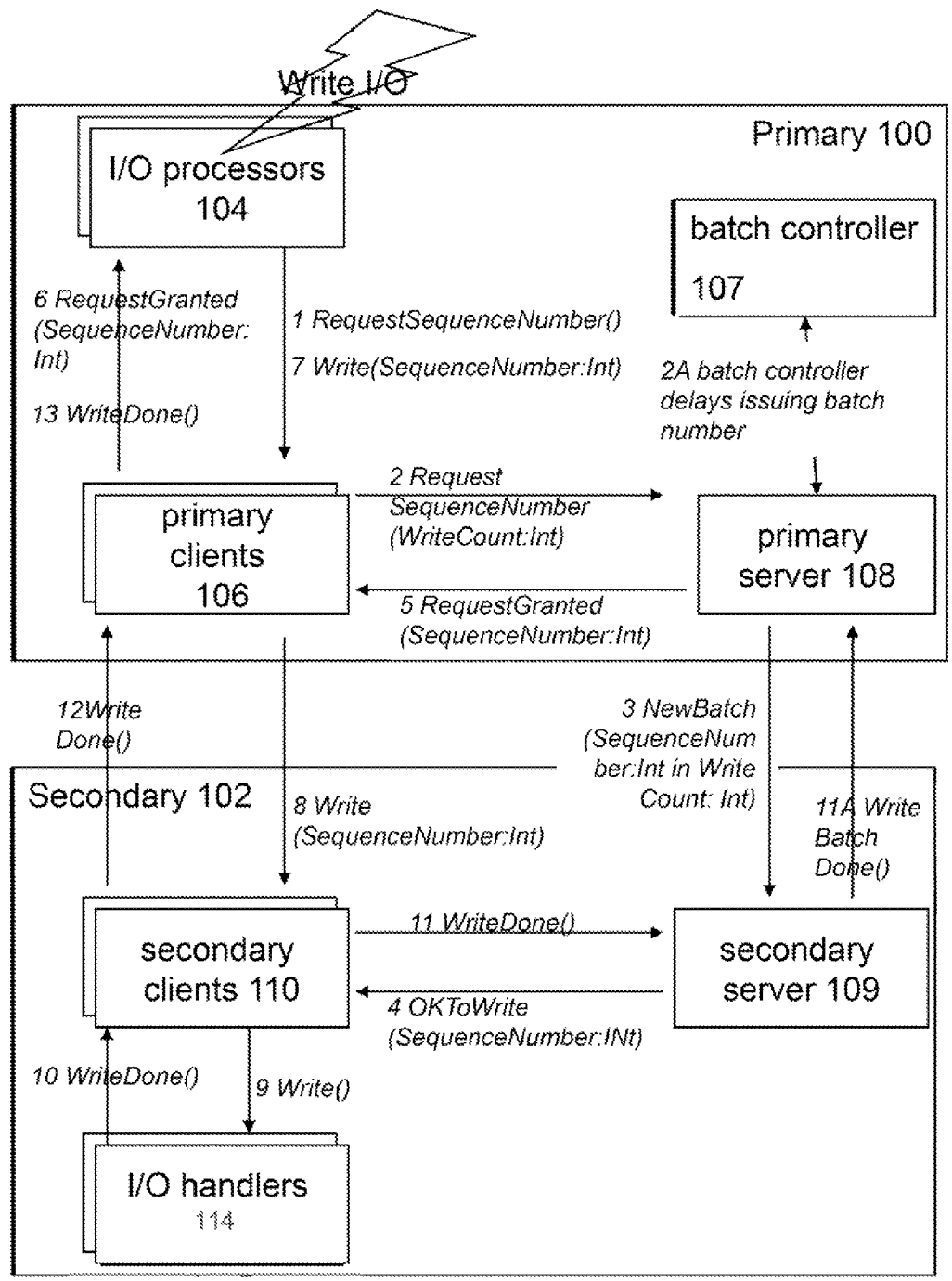
FIG. 2 shows a block diagram of a logic arrangement in which a method of operation according to an embodiment of the invention may be implemented.

Turning to FIG. 2, a method of operation according to an embodiment of the invention is illustrated. It will be clear to one of ordinary skill in the art that many modifications and variations, including, for example, variations in the sequence of actions, may be made without departing from the scope of the present invention.

In one embodiment, each I/O processor 104 communicates with respective primary clients 106 and primary server 108. Primary server 108 may batch the requests received in the same time frame. When a write I/O is received, an I/O processor 104 requests a sequence number from a primary client 106. The primary client 106 may forward the RequestSequenceNumber message to primary server 108. Batch controller 107 may grant a sequence number, and, in response, primary server 108 returns a RequestGranted message to the primary client 106.

Instead of primary server 108 batching concurrent requests on receipt and return of a RequestGranted message, in one embodiment, batch controller 107 delays the granting of the sequence number if there is a backlog of batches to be written by the secondary 102. The sequence number granted by primary server 108 is sent to the primary client 106 that requested a sequence number. Each primary client 106 notifies the I/O processor 104 and then sends the write I/O to its respective secondary client 110, embedding the sequence number within the Write message. Write I/Os that were active when the RequestSequenceNumber was issued may be assigned the granted sequence number, to prevent dependent writes from being placed in the same batch. In a multi-node system, other nodes may have received their grants and completed their I/Os already, for example.

Primary server 108 receives and collects RequestSequenceNumber messages from each primary client 106. Primary server 108 batches collected requests and defines a sequence batch but does not issue the batch number until batch controller 107 agrees. Primary server 108 then replies to each primary client 106 sending the granted sequence number. It also sends a NewBatch message to secondary server 109, telling it the sequence number that was issued, and how many write I/Os are defined by the sequence number.

Secondary clients 110 receive Write messages from primary clients 106. Each write is placed on a queue. When a secondary client 110 receives an OkToWrite message from secondary server 109 for a sequence number, the secondary client 110 pulls writes for this sequence number off the queue and executes them. When each write completes, secondary clients 110 send WriteDone messages to corresponding primary clients 106 and secondary server 109.

Secondary server 109 receives NewBatch messages from primary server 108. Secondary server 109 is responsible for coordinating secondary clients 110 and ensuring that writes are processed in sequence number order to maintain data consistency. When the first NewBatch arrives, secondary server 109 sends an OkToWrite message to each secondary client 110 so that they may process writes for the first sequence number as soon as they arrive. When secondary server 109 has received the expected number of WriteDone messages (one WriteDone for each write in the batch), secondary server 109 sends OkToWrite messages for the next sequence number. Secondary server 109 notifies primary server 108 when the write batch is done.

Batch controller 107 monitors the number of unprocessed sequence numbers, sequence numbers that have been granted but where the OKToWrite has not been sent from secondary server 109. Batch controller 107 delays the granting of the next sequence number if the issued unprocessed sequence numbers are above a certain threshold. Batch controller 107 calculates the number of unwritten batches by working out the difference between granted sequence numbers and the number of the batch that was last written.

In one embodiment, batch controller 107 contains a look-up table that maps ranges of sequence numbers that are outstanding to the amount of delay that should be used between issuing two sequence numbers. For example, Table 3 shows the range of outstanding batches in the left hand column of the table and the delay to be applied in the right hand column.

TABLE 3

| Range of sequence numbers not written to completion | Delay(ms) |
| --- | --- |
| 0 to 250 | 0 |
| 251 to 500 | 1 |
| 501 to 750 | 2 |
| 751 to 1000 | 4 |
| 1001 to 1250 | 8 |
| 1251 to 1500 | 16 |

So if there are 250 or fewer sequence numbers outstanding, there may be no delay between issuing two sequence numbers, to give optimum performance in low-load situations. The delay then increases as secondary 102 falls further behind (i.e., as more sequence numbers are outstanding). The specific ranges and delays will depend on the specific implementation and the level of secondary 102's performance that can be tolerated. In a different embodiment, the delay could be calculated from an algorithm.

When primary server 108 issues a sequence number, batch controller 107 calculates how many sequence numbers are currently in use. It then uses the look-up table to determine the delay to be used before issuing the next sequence number. This delay is stored for later use.

When a RequestSequenceNumber call is received by primary server 108, batch controller 107 calculates how much time has elapsed since a sequence number was last issued. Batch controller 107 compares this to the required delay (calculated above) and makes a decision; if the required delay has already elapsed, a sequence number is granted immediately, but if the required delay has not elapsed, the request is placed in a queue.

A separate process (or thread/fiber/timer, depending on the specific platform and implementation) may run and deal with queued requests. Each time the process runs, the process calculates the time that has elapsed since a sequence number was last issued. If the elapsed time is greater than the required delay, requests are removed from the queue and granted.

When a WriteBatchDone call is received by primary server 108, batch controller 107 will also need to recalculate the desired delay (the delay may now be less as secondary 102 has caught up by one sequence number) and grant any waiting requests if the new delay has already elapsed.

An exemplary method is as follows:

Action 1: One or more I/O processors 104 issue a request for a sequence number to a primary client 106. For example, the primary client 106 receives two messages from I/O processors 104 in the same time frame: RequestSequenceNumber (1) and RequestSequenceNumber (2). The parameter between the parentheses is the number of data items in the sequence. In this example, there are two requests of one item.

Action 2: Each primary client 106 passes on requests for a sequence number to primary server 108.

Action 2A: Primary server 108 delays issuing a new batch number if the number of unwritten batches is above a threshold number. For instance, if the last WriteBatchDone message received was WriteBatchDone (701) and the last RequestGranted message was RequestGranted (1001) then 1001 minus 701 is 300. 300 batches outstanding correspond to a delay of 1 ms from Table 1.

Action 3: Primary server 108 issues a new batch request to secondary server 109, and batches up the received requests from primary clients 106. For example, primary server 108 consolidates and notifies secondary server 109 of the new batch and the write count. If, for example, the batch is the one thousand and first batch, the sequence number is 1001, and the numbers of write counts is three for two plus one data items. Therefore, the message NewBatch(1001,3) is sent to secondary server 109.

Action 4: Independently of action 3, secondary server 109 sends an "OK to write" message for a specified sequence number to a secondary client 110. Action 4 may take place when there are no outstanding writes for a previous sequence number, if one exists. For example, secondary server 109 may notify the secondary client 110 that it is okay to write the five hundredth and first sequence number by calling OkToWrite (701) because the last WriteDone message was the seven hundredth batch.

Action 5: Primary server 108 grants the request for a sequence number to the primary client 106. This may be performed at the same time as action 3, for example, by sending the message RequestGranted(1001).

Action 6: The primary client 106 passes the RequestGranted message on to each requesting I/O processor 104. For example, the primary client 106 notifies relevant I/O processors 104 in the batch that the sequence number has been granted. At this stage, I/O processors 104 perform the I/O with respect to the sequence number 1001 received in the notification: RequestGranted(1001).

Action 7: Each I/O processor 104, in turn, issues a write for the specified sequence number to corresponding primary clients 106. For example, Write(701; 12) and Write(701; 34; 56) are issued to the first and second primary clients 106 where the first parameter in parenthesis is the sequence number and the subsequent parameters in parenthesis are the data bytes.

Action 8: The primary clients 106 pass on the write requests for the specified sequence number to the corresponding secondary clients 110. As in the above example, the first and second primary clients 106 call Write(701;12) and Write (701; 34; 56) to the first and second secondary clients 110, respectively.

Action 9: The writes are stored at the secondary clients 110 until an OkToWrite for the sequence number is received. Once the sequence has been approved, the individual writes from secondary 102 are issued to corresponding I/O handlers 114, which perform the write I/O. In the above example, the secondary clients 110 each receive OkToWrite(701), and individual Write instructions that make up batch 701 are sent to the I/O handlers 114. For example, Write(12) and Write (34,56) are issued to the first and second I/O handlers 114 for sequence 701.

Action 10: The I/O handlers 114 return a WriteDone message to the secondary clients 110 for the individual writes.

Action 11: The secondary clients 110 pass the WriteDone messages to secondary server 109, indicating the sequence number in the message. For example, for sequence 701, the secondary clients 110 will pass two WriteDone (701) messages to secondary server 109.

Action 11A: When the WriteDone messages for a batch are received, the secondary server 109 passes a WriteBatchDone message back to the primary server 108. The batch controller 107 uses this message to keep track of the batches that have not been written. For instance, after two WriteDone(701) messages, the secondary server 109 passes a WriteBatchDone(701) message to the primary server 108.

Action 12: The secondary clients 110 pass the WriteDone messages to the primary clients 106.

Action 13: The primary clients 106 pass the WriteDone messages back to the corresponding I/O processors 104.

The embodiment of the present invention in the form of a method or logic arrangement thus advantageously addresses the problem of providing a technological means for preserving consistency of data in a remote copy facility and also may use minimal additional resources. It will be clear to one of ordinary skill in the art that certain of the actions shown here in sequential fashion as they are numbered may in fact be processed concurrently, and that certain actions may be required to wait for the completion of other operations, and that the sequence shown is merely exemplary of the processing that may be performed by an embodiment of the present invention. For example, as shown above, the performance of action 4 may be delayed until after the completion of actions 5 to 11 for a preceding sequence number, or action 4 may be performed immediately, as, for example, on a first iteration of the method, when no write activity for any previous sequence number would be in process.

It will be clear to one of ordinary skill in the art that all or part of the method of the exemplary embodiments of the invention may suitably and usefully be embodied in a logic apparatus, or a plurality of logic apparatus, comprising logic elements arranged to perform the method and that such logic elements may comprise hardware components, firmware components or a combination thereof.

It will be equally clear to one of skill in the art that all or part of a logic arrangement according to the exemplary embodiments of the present invention may suitably be embodied in a logic apparatus comprising logic elements to perform the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions may be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the exemplary embodiment of the invention may be realized in the form of a computer implemented service that deploys computer program code operable to, when deployed into a computer infrastructure and executed thereon, cause the computer system to perform the method.

In a further alternative, the embodiment of the present invention may be realized in the form of a data carrier having functional data thereon, the functional data comprising functional computer data structures to, when loaded into a computer system and operated upon thereby, enable the computer system to perform the method.

It will be clear to one skilled in the art that many improvements and modifications may be made to the foregoing exemplary embodiment without departing from the scope of the present invention.

The invention claimed is:

1. A storage control system comprising:
   one or more I/O processors for receiving requests to write data;
   a batch controller for selecting one or more write requests to be placed in a first batch;
   a first server for transmitting the first batch to a second server in a remote copy pair system;
   wherein one or more I/O handlers are provided for writing the first batch to completion on a data storage medium, in response to receiving permission from the second server; and
   wherein one or more clients communicate with the I/O processors and the I/O handlers,
   wherein the second server grants permission to the one or more I/O handlers to write the first batch on the data storage medium, wherein the first batch is within a first range of sequence numbers not written to completion, if the second server is notified by the I/O handlers that previous write requests have been completed,
   wherein the transmission of a second batch from the first server to the second server is delayed by a first time period by delaying issuance of a sequence number from a batch controller to the first server, in response to determining that a first number of batches in the first range of sequence numbers are not yet written to completion on the data storage medium, and
   wherein the transmission of a third batch from the first server to the second server is delayed by a second time period by delaying issuance of a sequence number from the batch controller to the first server, in response to determining that a second number of batches in a second range of sequence numbers are not yet written to completion on the data storage medium,
   wherein the first range of sequence numbers that are not written to completion and the second range of sequence numbers that are not written to completion are mutually exclusive, and
   wherein a delay in issuance of sequence numbers from the batch controller to the first server for subsequent batches is increased or decreased, as the number of batches in the range of sequence numbers that are not yet written to completion on the data storage medium respectively increases or decreases.

2. A storage control system according to claim 1,
   wherein the batch controller grants a sequence number for the first batch and
   wherein transmission of the first batch is delayed by delaying the granting of sequence number.

3. A storage control system according to claim 1, wherein writes within the first batch are mutually independent.

4. A storage control system according to claim 1, further comprising:
   a first message for requesting a sequence number,
   wherein a first I/O processor forwards the first message to a corresponding first client, in response to receiving a first write request,
   wherein the first client forwards the first message to the first server, in response to receiving the first message from the first I/O processor.

5. A storage control system according to claim 1, further comprising:
   a second message for granting the sequence number,
   wherein the first server forwards the second message to the first client,
   wherein the first client forwards the second message to the first I/O processor, in response to receiving the second message from the first server.

6. A storage control system according to claim 1, further comprising:
   a third message for writing a new batch,
   wherein the first server forwards the third message to the second server, in response to consolidating the first batch.

7. A storage control system according to claim 1, further comprising:
   a fourth message for granting permission to write data to the storage medium,
   wherein the second server forwards the fourth message to a second client, in response to having no outstanding write requests for a previous batch.

8. A storage control system according to claim 1, further comprising:
   a fifth message for writing data to the storage medium,
   wherein the first I/O processor forwards the fifth message to the first client, in response to receiving a second message,
   wherein the first client forwards the fifth message to the second client, wherein the second client forwards the fifth message to a first I/O handler, in response to receiving a fourth message from the second server.

9. A storage control system according to claim 1, further comprising:
a sixth message for notifying completion of the first write request,
wherein the first I/O handler forwards the sixth message to the second client, in response to completing the request to write data,
wherein the second client forwards the sixth message to the first client and the second server, in response to receiving the sixth message from the first I/O handler,
wherein the first client forwards the sixth message to the first I/O processor, in response to receiving the sixth message from the second client.

10. A storage control system according to claim 1, further comprising:
a seventh message for notifying the completion of the first batch,
wherein the second server forwards the seventh message to the first server, in response to having no outstanding write requests in the first batch.

11. A method of operation for a storage control system, the method comprising:
receiving requests to write data by one or more I/O processors;
selecting using a batch controller one or more write requests to be placed in a first batch;
transmitting the first batch to a second server from a first server in a remote copy pair system;
wherein one or more I/O handlers are provided for writing the first batch to completion on a data storage medium, in response to receiving permission from the second server; and
wherein one or more clients communicate with the I/O processors and the I/O handlers,
wherein the second server grants permission to the one or more I/O handlers to write the first batch on the data storage medium,
wherein the second server is notified by the I/O handlers that previous write requests have been completed,
wherein the transmission of a second batch from the first server to the second server is delayed by a first time period by delaying issuance of a sequence number from a batch controller to the first server, in response to determining that a first number of batches in the first range of sequence numbers are not yet written to completion on the data storage medium, and
wherein the transmission of a third batch from the first server to the second server is delayed by a second time period by delaying issuance of a sequence number from the batch controller to the first server, in response to determining that a second number of batches in a second range of sequence numbers are not yet written to completion on the data storage medium,
wherein the first range of sequence numbers that are not written to completion and the second range of sequence numbers that are not written to completion are mutually exclusive, and
wherein a delay in issuance of sequence numbers from the batch controller to the first server for subsequent batches is increased or decreased, as the number of batches in the range of sequence numbers that are not yet written to completion on the data storage medium respectively increases or decreases.

12. A computer program product comprising a non-transient computer useable medium having a computer readable program, wherein the computer readable program when executed on a computer causes the computer to:
receive requests to write data by one or more I/O processors;
select using a batch controller one or more write requests to be placed in a first batch;
transmit the first batch to a second server from a first server in a remote copy pair system;
wherein one or more I/O handlers are provided for writing the first batch to completion on a data storage medium, in response to receiving permission from the second server; and
wherein one or more clients communicate with the I/O processors and the I/O handlers,
wherein the second server grants permission to the one or more I/O handlers to write the first batch on the data storage medium,
wherein the second server is notified by the I/O handlers that previous write requests have been completed,
wherein the transmission of a second batch from the first server to the second server is delayed by a first time period by delaying issuance of a sequence number from the batch controller to the first server, in response to determining that a first number of batches in the first range of sequence numbers are not yet written to completion on the data storage medium, and
wherein the transmission of a third batch from the first server to the second server is delayed by a second time period by delaying issuance of a sequence number from the batch controller to the first server, in response to determining that a second number of batches in a second range of sequence numbers are not yet written to completion on the data storage medium,
wherein the first range of sequence numbers that are not written to completion and the second range of sequence numbers that are not written to completion are mutually exclusive, and
wherein a delay in issuance of sequence numbers from the batch controller to the first server for subsequent batches is increased or decreased, as the number of batches in the range of sequence numbers that are not yet written to completion on the data storage medium respectively increases or decreases.

* * * * *